(12) United States Patent
Nordback

(10) Patent No.: US 9,529,816 B2
(45) Date of Patent: Dec. 27, 2016

(54) ARBITRATING AMONG CONCURRENT EDITORS OF SHARED DOCUMENTS

(71) Applicant: Kurt N. Nordback, Boulder, CO (US)

(72) Inventor: Kurt N. Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 243 days.

(21) Appl. No.: 13/750,056

(22) Filed: Jan. 25, 2013

(65) Prior Publication Data

US 2014/0214756 A1     Jul. 31, 2014

(51) Int. Cl.
*G06F 7/00* (2006.01)
*G06F 17/30* (2006.01)
*G06F 13/14* (2006.01)

(52) U.S. Cl.
CPC ... *G06F 17/30165* (2013.01); *G06F 17/30011* (2013.01)

(58) Field of Classification Search
CPC .................. G06F 17/24; G06F 21/6209; G06F 2221/2147; G06F 17/2288; G06F 8/427; G06F 17/30011; G06F 17/30165; G06F 17/30171; G06F 17/30091; G06F 17/30067
USPC ............... 715/200–205, 234, 751, 255, 733, 741,715/765, 707, E17.008; 707/1, 999.01, 608, 707/999.008, E17.01, 704, 822, 999.001, 707/999.006, 999.009; 717/143
See application file for complete search history.

(56) References Cited

U.S. PATENT DOCUMENTS

| | | | | |
|---|---|---|---|---|
| 8,196,029 B1 * | 6/2012 | Rucker | ............... | G06F 17/2288 715/200 |
| 2007/0186157 A1 * | 8/2007 | Walker | .................... | G06F 17/24 715/234 |
| 2010/0254604 A1 * | 10/2010 | Prabhakara | ........ | G06K 9/00469 382/173 |

* cited by examiner

*Primary Examiner* — Usmaan Saeed
*Assistant Examiner* — Cecile Vo
(74) *Attorney, Agent, or Firm* — Osha Liang LLP

(57) ABSTRACT

A method for managing an electronic document (ED) concurrently accessed by multiple editors includes receiving a first chunk size for the ED, partitioning the ED into chunks, and receiving, from an editor, a selection of a first chunk, where the first chunk is of the first chunk size. The method further includes locking the first chunk in response to determining that the first chunk is available for editing, sending, to the first editor, a first message indicating that the first chunk has been locked, and sending, to a second editor, a second message indicating that the first chunk has been locked.

18 Claims, 4 Drawing Sheets

ARBITRATING AMONG CONCURRENT EDITORS OF SHARED DOCUMENTS

BACKGROUND

Not long in the past, nearly all documents created had only a single author. Books, articles, scholarly papers, and so on were almost invariably the work of a single individual. Collaboration on a given piece of text was rare, no doubt in large part because it was difficult—involving the physical transfer of pieces of paper from one co-author to another. For example, we think of the Christian Bible as a group-authored document, but in fact it was compiled from numerous sources long after they had been completed. Marie and Pierre Curie managed collaborative authorship, but they were a married couple. Not all authors wishing to collaborate have that advantage.

The advent of electronic documents greatly simplified the process of collaborative authorship, because it allowed the moving of bits to replace the moving of physical paper. Co-authorship, or tightly coupled author-editor exchanges, became more common. This has been particularly beneficial in technical documents, where each author may have a slightly different area of expertise.

But until recently, co-authorship involved either a time-sharing model, in which the authors alternated the (virtual) possession of the document, or a parallel-access-and-merge model, in which authors had possession simultaneously, but periodically had to merge changes into a single version to prevent their individual versions from diverging too far. The recent advent of simultaneous editing capabilities in cloud-computing services changed that, and allowed for a much more interactive level of collaborative authorship wherein multiple authors can edit a single document at the same time.

SUMMARY OF INVENTION

In general, in one aspect, the invention relates to a method for managing an electronic document (ED) concurrently accessed by a plurality of editors. The method comprises receiving, by a processor, a first chunk size for the ED; partitioning the ED into a plurality of chunks; receiving, from a first editor of the plurality of editors, a selection of a first chunk of the plurality of chunks, wherein the first chunk is of the first chunk size; locking the first chunk in response to determining that the first chunk is available for editing; sending, to the first editor, a first message indicating that the first chunk has been locked; and sending, to a second editor of the plurality of editors, a second message indicating that the first chunk has been locked.

In general, in one aspect, the invention relates to a non-transitory computer readable medium storing instructions for managing an electronic document (ED) concurrently accessed by a plurality of editors. The plurality of instructions comprises functionality to: receive a first chunk size for the ED; partition the ED into a plurality of chunks; receive, from a first editor of the plurality of editors, a selection of a first chunk of the plurality of chunks, wherein the first chunk is of the first chunk size; lock the first chunk in response to determining that the first chunk is available for editing; send, to the first editor, a first message indicating that the first chunk has been locked; and send, to a second editor of the plurality of editors, a second message indicating that the first chunk has been locked.

In general, in one aspect, the invention relates to a system for managing an electronic document (ED) concurrently accessed by a plurality of editors. The system comprises: a server, configured to: receive a first chunk size for the ED; partition the ED into a plurality of chunks; receive, from a first editor of the plurality of editors, a selection of a first chunk of the plurality of chunks, wherein the first chunk is of the first chunk size; lock the first chunk in response to determining that the first chunk is available for editing; send, to the first editor, a first message indicating that the first chunk has been locked; send, to a second editor of the plurality of editors, a second message indicating that the first chunk has been locked; a first device of the first editor, configured to: send the selection of the first chunk; receive the first message; and a second device of the second editor, configured to: receive the second message.

Other aspects and advantages of the invention will be apparent from the following description and the appended claims.

DETAILED DESCRIPTION

Figure 1:
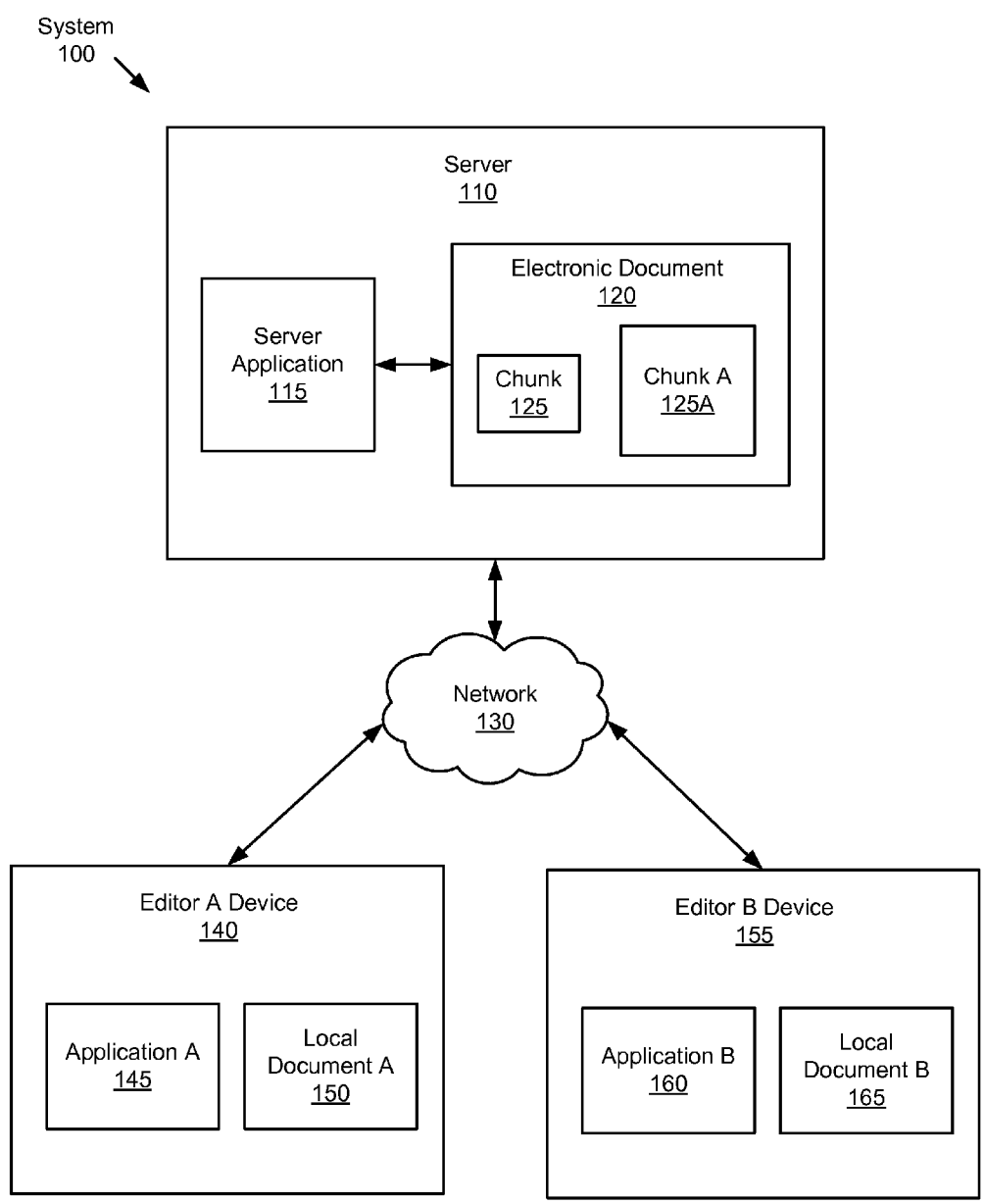
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, throughout this specification, the terms "shared document" and "concurrent document" may be used interchangeably.

In general, embodiments of the invention provide a method and system for managing an electronic document (ED) concurrently accessed by a plurality of editors, by locking chunks of the ED. A chunk is a unit or units of measurement into which the ED is split, and may vary in size based on a variety of factors, explained below. Specifically, a chunk size is received, and the ED is partitioned into chunks. A chunk selection is received from an editor, and if the chunk selection is available for editing, the selected chunk is locked, and a message is sent to all editors alerting them that the selected chunk is locked. The editor may then make his or her changes to the selected chunk of the ED. Chunk sizes may be altered over time based on, for example, increases or decreases in the number of editors concurrently accessing the ED.

FIG. 1 shows System (100) which includes Server (110), Server Application (115), Electronic Document (120), Chunk (125), Chunk A (125A), Network (130), Editor A Device (140), Application A (145), Local Document A (150), Editor B Device (155), Application B (160), and Local Document B (165). Server (110) may be any computing device including, but not limited to: a server, a personal computer, a laptop, a cell phone, a smart phone, and/or any other suitable device. Server (110) is communicatively connected to Network (130), may have Server Application (115) executing on it, and may store Electronic Document (120).

In one or more embodiments of the invention, Server Application (115) is an application executing on Server (110) for concurrently editing a shared document (i.e., Electronic Document (120)). Server Application (115) may be a word processing application, a slideshow application, a chart/graph application, a sound recording application, a spreadsheet application, any productivity application, and/or any other suitable application.

In one or more embodiments of the invention, Electronic Document (120) is any file(s) or document(s) including, but not limited to, a word processing document, a slide show deck, a sound recording, a chart/graph, and/or any other suitable document or file. Electronic Document (120) is stored on Server (110) and may be edited by multiple editors (e.g., Editor A Device (140) and Editor B Device (155)) simultaneously. Further, in one or more embodiments of the invention, Electronic Document (120) is stored in multiple locations: a master copy on Server (110) and local copies (e.g., Local Document A (150) and Local Document B (165)) on any editor device(s) (e.g., Editor A Device (140) and Editor B Device (155)). In one or more embodiments of the invention, Electronic Document (120) is a document in OOXML format.

In one or more embodiments of the invention, the content of Electronic Document (120) may be broken down in units/segments of various sizes, called chunks (i.e., Chunk (125) and Chunk A (125A)). A chunk may be any unit by which Electronic Document (120) may be partitioned, and may vary based on the file type of the Electronic Document (120). For example, if Electronic Document (120) is a word processing document, Chunk (125) may be a page, a section, a chapter, a paragraph, a run, a sentence, a line, etc. Alternatively, if Electronic Document (120) is a presentation/slideshow deck, then Chunk (125) may be a slide, a paragraph, a run, a sentence, a line, etc. Further still, if Electronic Document (120) is a spreadsheet, then Chunk (125) may be a sheet, a cell, a paragraph, a column, a row, etc. It will be apparent that Chunk (125) and Chunk A (125A) represent a level of granularity for locking; they may vary based on document type; and they may be of any size. As such, the invention should not be limited to the above examples.

In one or more embodiments of the invention, Chunk (125) is a set size for a given document (e.g., Electronic Document (120)), and may be established by the creator of the document. Alternatively, the size of Chunk (125) may be selected by an editor of the document (e.g., Editor A Device (140) and/or Editor B Device (155)). The size of Chunk (125) may be automatically determined or manually set. In one or more embodiments of the invention, the size of Chunk (125) may be updated dynamically. That is, while Electronic Document (120) is being edited, the size of Chunk (125) may change—even if portions of the document are currently locked. In one or more embodiments of the invention, although Chunk (125) and Chunk A (125A) are both segments of the same document, they are different sizes. That is, there may be some chunks that are runs, while others are paragraphs, and others are sections. For example, a first editor of Electronic Document (120) may set the size of their chunk (e.g., Chunk (125)) to paragraphs, while a second editor of Electronic Document (120) may set the size of their chunk (e.g., Chunk A (125A)) to runs. There are many ways to set the size of a chunk(s) and many different sizes of chunks and, as such, the invention should not be limited to the above examples.

For easier understanding, a series of examples of how and/or why chunk sizes may change will be provided. For example, the size of Chunk (125) and/or Chunk A (125A) may be calculated based on a variety of factors including, but not limited to: the overall size of the document, the complexity of the document, the current number of editors, and/or any other factor. The calculations, as well as the changes in the size of Chunk (125) may be automatic. For example, as the length of the document changes, or as the number of concurrent editors increases (or decreases), the size of Chunk (125) may automatically increase or decrease. Specifically, as the number of concurrent editors increases, the size of Chunk (125) may decrease (e.g., paragraphs to runs). Likewise, as editors leave the document, the size of Chunk (125) may increase (e.g., paragraphs to sections). Further, as the size of Electronic Document (120) increases, the size of Chunk (125) may increase (e.g., runs to paragraphs). Likewise, as the size of Electronic Document (120) decreases, the size of Chunk (125) may also decrease (e.g., sections to paragraphs). Optionally, as the complexity of Electronic Document (120) increases, the size of Chunk (125) may increase (e.g., run to section). Finally, as the complexity of Electronic Document (120) decreases, the size of Chunk (125) may decrease (e.g., paragraphs to runs). It will be apparent that there are many factors by which the size of Chunk (125) may change and, as such, the invention should not be limited to the above examples.

A new chunk size may be set (i.e., calculated) at any time. In one or more embodiments of the invention, the size of an already locked chunk is not affected by the newly set chunk size until the lock is released and the editor tries to lock a new chunk. In one or more embodiments of the invention, the size of a locked chunk is updated immediately (i.e., even before the lock is released) in response to the newly set chunk size. It will be apparent that there are many ways to alter the size of a chunk and, as such, the invention should not be limited to the above examples.

Returning to Server Application (115), in one or more embodiments of the invention, Server Application (115) is responsible for partitioning the Electronic Document (120) into multiple chunks and locking one or more chunks for each editor. Server Application (115) may lock Chunk (125) in any manner now known or later developed. Additionally, as described above, different editors may lock chunks of different sizes. As also described above, chunk sizes may change at any time. Additionally, Server Application (115) makes any alterations or approved changes to Electronic Document (120) (such as adding content, removing content, cut, paste, etc.) from any editors, as well as handling communication with the editors of Electronic Document (120). Examples of communication with the editors may include, but is not limited to: messages indicating that a chunk is locked for editing by another editor, messages indicating that a chunk has been successfully locked and may now be edited, messages updating the document based on changes made by other editors, and/or any other suitable message.

In one or more embodiments of the invention, two types of changes to the Electronic Document (120) are possible: formatting changes and non-formatting changes. Non-formatting changes are changes that alter the content of Electronic Document (120) such as adding new content (e.g., words), removing existing content, cut, paste, replace, etc. Formatting changes do not alter the content of a chunk and may include, but are not limited to: changing the font color, font type, font size, margins, paper type, and/or any other change that does not alter the content of a chunk. Server Application (115) is able to determine which type of change a given editor is attempting to make. In one or more embodiments of the invention, when an editor is attempting to only change the format of a chunk (or at least a portion of the chunk), there is no need to check if the chunk to be edited is locked. That is, if Editor A desires to change the font of the entire Electronic Document (120), then Server Application (115) need not check if there is a locked chunk in Electronic Document (120) at that moment in time. Alternatively, a check may be performed regardless. It will be apparent that there are many different ways that documents may be edited without changing the content and, as such, the invention should not be limited to the above examples.

Further, in one or more embodiments of the invention, Server Application (115) has rules in place for monitoring idle editors. In other words, Server Application (115) will not allow a single editor to lock a chunk indefinitely, unless the editor is actively editing. Thus, after a set amount of idle time (i.e., an interval of no activity), or some other metric, has passed, Server Application (115) will unlock Chunk (125) automatically. It will be apparent that there many ways to ensure a single editor does not monopolize a given chunk and, thus, the invention should not be limited to the above examples.

In one or more embodiments of the invention, Network (130) is any network or communicative connection between Server (110) and the editors (i.e., Editor A Device (140) and Editor B Device (155)) of Electronic Document (120). For example, Network (130) may be a local area network (LAN), a wide area network (WAN) such as the Internet, and/or any other type of network. Network (130) may be of any type and, as such, the invention should not be limited to the above examples.

In one or more embodiments, Editor A Device (140) and Editor B Device (155) are devices that editors use to access and edit Electronic Document (120). Editor A Device (140) and Editor B Device (155) may be any suitable device including, but not limited to: a personal computer, a laptop, a cell phone, a smart phone, a tablet computer, a gaming device, an e-reader, etc. In one or more embodiments of the invention, Editor A Device (140) and Editor B Device (155) execute an application (i.e., Application A (145) and Application B (160)) for concurrently editing a document. Application A (145) and Application B (160) may, for example, be a word processing application, a spreadsheet application, a slideshow application, a web browser, etc. Application A (145) and Application B (160) may be a thin-client application, where most of the processing is performed on Server (110). Alternatively, Application A (145) and Application B (160) may be fat-client where most of the processing is performed on the local device (i.e., Editor A Device (140) and Editor B Device (155)).

In one or more embodiments of the invention, Editor A Device (140) and Editor B Device (155) contain a local copy of Electronic Document (120) (i.e., Local Document A (150) and Local Document B (165)). Local Document A (150) and Local Document B (165) may not be consistent with Electronic Document (120) at all times. For example, if an editor changes the local copy while not online, then the content of the local copy would need to be subsequently merged into Electronic Document (120) when the editor is subsequently online. The merge may be done in any manner now known or later developed.

Figure 2:
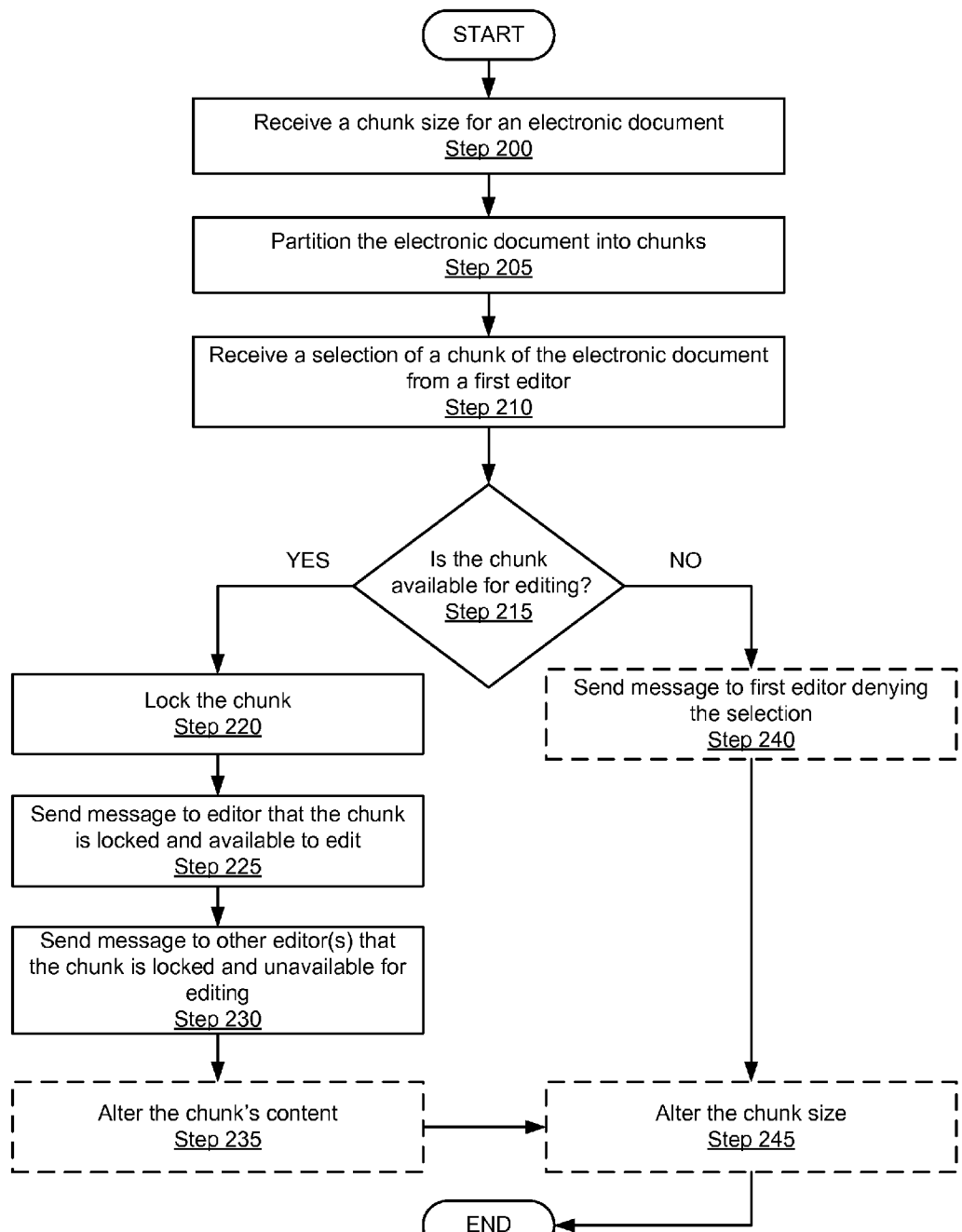
FIG. 2 shows a flowchart in accordance with one or more embodiments of the invention.

FIG. 2 shows a flowchart showing a computer implemented process for managing an electronic document concurrently accessed by a plurality of editors. The process can be carried out on the Server (110) by that the processor of the Server (110) executes Server Application (115) that is stored in a storage device of Server (110), and can be initiated as a part of the whole process of the Server Application (115) in response to an event that represents at least one editor requests to edit an electronic document. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, a chunk size for an electronic document is received, in accordance with one or more embodiments of the invention. The chunk size may be received from many different sources, including: the creator of the shared document, an editor of the shared document, calculated based on a variety of factors, and/or any other suitable source. In one or more embodiments of the invention, there may be more than one chunk size for a shared document, such as one chunk size per editor. Additionally, the chunk size may vary dynamically as the shared document is edited, even if chunks are locked. Further, the chunk size may vary based on the file type of the shared document. In one or more embodiments of the invention, once set by any means, the chunk size is permanent. Alternatively, the chunk size is changeable at any time, and by any of the means described in this specification. For example, the chunk size may be set by the creator of the ED, and this chunk size might or might not be changeable by the present/future editors of the ED.

In one or more embodiments of the invention, the chunk size is any measurable unit within the shared document. For example, if the shared document is a word processing document, the chunk size may be a section, page, paragraph, run, line, sentence, and/or any other suitable unit. Conversely, if the shared document is a slide show document, then the chunk size may be a slide, paragraph, run, sentence, line, etc. If the shared document is a spreadsheet then the chunk size may be a row, column, cell, etc. It will be apparent that the invention should not be limited to the above examples.

In Step 205, the electronic document is partitioned into a set of chunks, in accordance with one or more embodiments of the invention. The ED may be partitioned in any method now known or later developed. At this stage, a management table may be generated to manage each chunk of the ED as to who is currently using (locking). The initial value of field corresponding to each chunk is null, which means the chunk is not locked. In one or more embodiments of the invention, each chunk in the set is of the specified chunk size. In one or more embodiments of the invention, only some of the chunks in the set are of the specified chunk size (i.e., the chunks in the set need not be uniform in size).

In Step 210, a selection of a chunk of the electronic document is received from an editor, in accordance with one or more embodiments of the invention. The selection of the chunk may be made and received in any method now known or later developed. The chunk is the portion of a document which an editor intends to edit. In one or more embodiments of the invention, the editor selects the chunk by highlighting at least a portion of the chunk within a graphical user interface (GUI) operated by the editor. In one or more embodiments of the invention, the editor selects the chunk from a list of chunks displayed within the GUI. In one or more embodiments of the invention, the editor operates one or more widgets within the GUI (e.g., buttons, radio buttons, drop-down lists, sliders, etc.) to select the chunk.

In Step 215, it is determined whether the chunk is available for editing, in accordance with one or more embodiments of the invention. The determination may include a simple comparison that determines if the given chunk has been locked by another editor, or may be determined by any other suitable method. This determination may be achieved by confirming the management table. Specifically, the value corresponding to the chunk is examined whether the corresponding field is null or filled with an editor identifier. If the chunk is not available for editing (i.e., the corresponding field in the management table has a value not null, and thus it is already locked), then the method proceeds to Step 240. If the chunk is available for editing (i.e., the corresponding field of the management table is null, and thus it is not locked), then the method proceeds to Step 220.

In Step 220, the chunk is locked, in accordance with one or more embodiments of the invention. The chunk may be locked in any manner now known or later developed. For instance, according to one exemplary embodiment, the management table is updated to fill the corresponding field with an editor identifier associated with the editor A. This field will be erased or deleted to null upon an event to unlock the chunk. Further, the chunk may be of any size, as described above. In one or more embodiments the size of the chunk, and therefore the lock, may change while the lock is active.

In Step 225, a message is sent to the editor that the chunk is locked, in accordance with one or more embodiments of the invention. The message may be sent in any format, and using any method, now known or later developed. In one or more embodiments of the invention, in response to this message, the chunk within the GUI operated by the editor may be modified (e.g., highlighted, font color change, etc.) to confirm the chunk is locked and the editor now has editing rights to the chunk.

In Step 230, a message is sent to the other editors concurrently accessing the ED that the chunk is locked, in accordance with one or more embodiments of the invention. The message may be sent in any format, and using any method, now known or later developed. In one or more embodiments of the invention, in response to this message, the chunk within the GUIs operated by the other editors may be modified (e.g., highlighted, font color change, etc.) to alert the other editors that the chunk is now locked and is unavailable for editing by the other editors. However, unlocked chunks in the set are still available to be edited by other editors. In one or more embodiments of the invention, the identity of the editor having the lock on the chunk, e.g., the editor identifier in the management table associated with the locked chunk, is displayed to other editors.

In Step 235, content within the chunk is modified by the editor having the lock on the chunk, in accordance with one or more embodiments of the invention. Step 235 is optional, and may not always be performed, or may be performed in a different order than is shown in FIG. 2. In one or more embodiments of the invention, the modifications to the chunk are only made available to other editors when the chunk is unlocked. In one or more embodiments of the invention, the modifications to the chunk are periodically flushed out to the other editors even when the chunk is still locked.

In Step 245, the chunk size is altered, in accordance with one or more embodiments of the invention. The chunk size may be altered in any manner, and for any reason, as described above. In one or more embodiments of the invention, the already locked chunks may increase or decrease in size. In one or more embodiments of the invention, the ED may be repartitioned into a new set of chunks based on the altered chunk size. The management table may also be also altered to keep conformity to the altered chunk size. Any subsequent requests from editors will be to lock one or more of the chunks in the new set of chunks. Further, Step 245 is optional, and may not always be performed, or may be performed in a different order than is shown in FIG. 2. After Step 245, the method ends.

After determining that the chunk is not available for editing, the method proceeds to Step 240, and a rejection message is sent to the editor denying the selection, in accordance with one or more embodiments of the invention. The message may be sent in any format, and using any method, now known or later developed. Step 240 is optional, and may not always be performed, or may be performed in a different order than is shown in FIG. 2. In one or more embodiments of the invention, the selection of the chunk by the editor is simply ignored/discarded and no rejection message is sent. After Step 240, the method may proceed to Step 245, or may end.

The following section describes various examples. The examples are included to aid in the understanding of the invention and are not intended to limit the scope of the invention.

Figure 3:
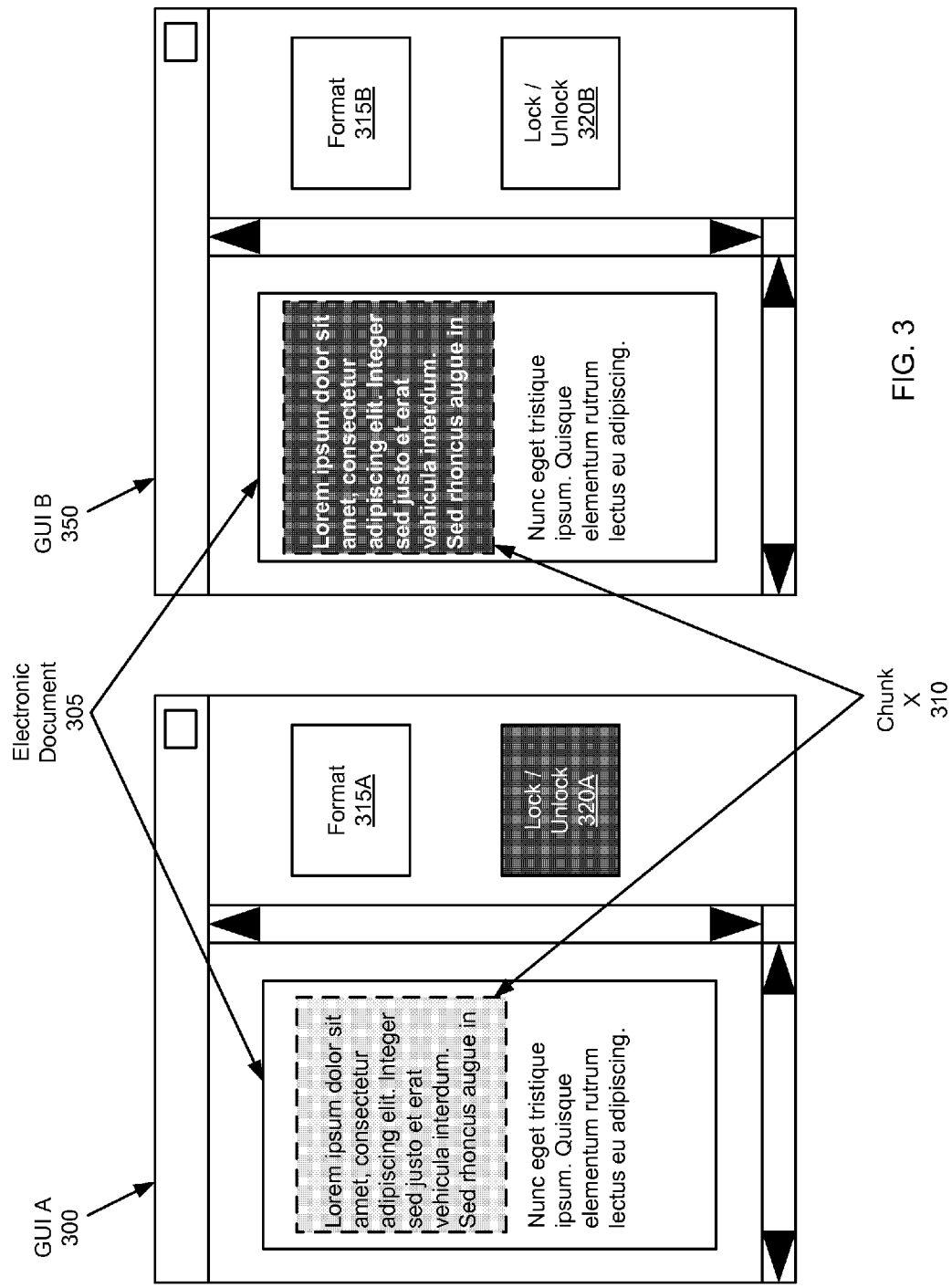
FIG. 3 shows an example in accordance with one or more embodiments of the invention.

FIG. 3 shows an example in accordance with one or more embodiments of the invention. As shown in FIG. 3, two GUIs exist: GUI A (300) and GUI B (350). GUI A (300) is operated/viewed by editor A (not shown), while GUI B (350) is operated/viewed by editor B (not shown). Both editor A and editor B are simultaneously/concurrently accessing an electronic document (305) (i.e., a word processing document). Accordingly, both GUIs (300, 350) are displaying the ED (305).

Still referring to FIG. 3, assume the ED (305) has been partitioned into multiple chunks. Specifically, each paragraph in the ED (305) corresponds to a different chunk (i.e., the chunk size is a paragraph). Editor A wishes to edit the content of chunk X (310). Accordingly, Editor A selects chunk X (310) and clicks the Lock/Unlock button (320A). Once chunk X (310) is locked, chunk X (310) is highlighted on GUI A (300), indicating to the first editor that he has exclusive access to chunk X (310) and may make any change to chunk X (310). The Lock/Unlock button (320A) may remain highlighted to indicate a lock exists. Alternatively, instead of providing the Lock/Unlock button (320A) on the GUI A (300), the chunk X (310) may be locked automatically once the chunk X (310) is selected by editor A. In this instance, unlocking the chunk X (310) may be achieved by any operation by editor A that represents his/her intention to exit from the chunk X (310) (e.g., clicking on the displayed ED (305) outside of the highlighted area, selecting different chunk, and so on).

Once chunk X (110) is locked, chunk X (310) is displayed with dark highlighting within GUI B (350). This is an indication to editor B that chunk X (310) is locked by another editor (i.e., editor A), and thus the content of chunk X (310) cannot be edited by editor B. However, it is still possible for editor B to change the formatting (e.g., font color) of chunk X (310). Specifically, editor B may select chunk X (310) and click the format button (315B) to issue a formatting request for chunk X (310). Lock/Unlock button (320B) and Format button (315A) are essentially the same as Lock/Unlock button (320A) and Format button (315B), respectively.

Although not shown in FIG. 3, both GUIs (300, 350) may include widgets (e.g., buttons) to contact other editors. Moreover, both GUIs (300, 350) may display hover boxes/shapes over/adjacent to a locked chunk and disclose the identity of the editor having the lock on the chunk.

Figure 4:
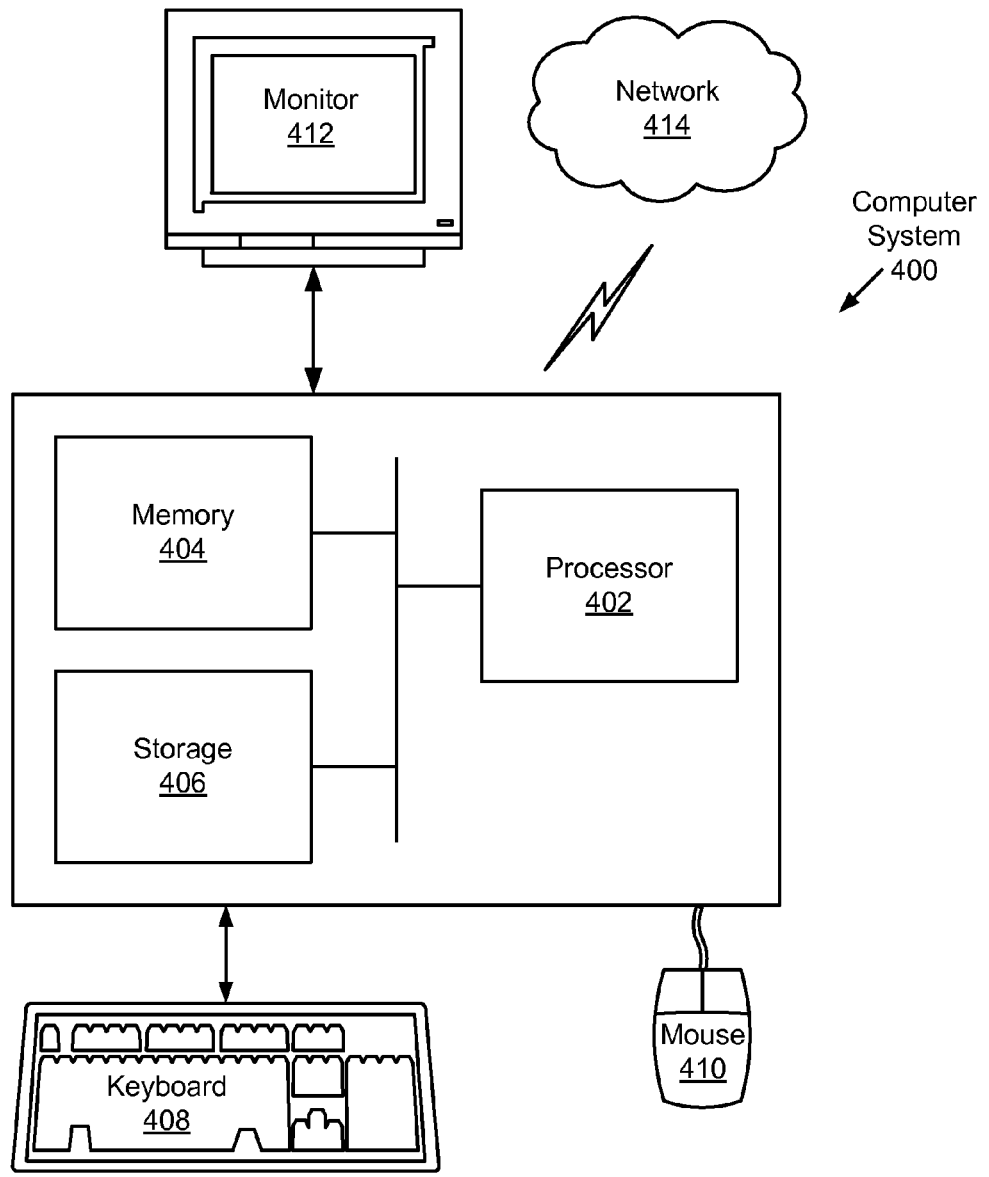
FIG. 4 shows a computer system in accordance with one or more embodiments of the invention.

Embodiments of the invention may be implemented on virtually any type of computer regardless of the platform being used. For example, as shown in FIG. 4, a Computer System (400) includes one or more Processor(s) (402) (such as a central processing unit (CPU), integrated circuit, hardware processor, etc.), associated Memory (404) (e.g., RAM, cache memory, flash memory, etc.), a Storage Device (406) (e.g., a hard disk, an optical drive such as a compact disk drive or digital video disk (DVD) drive, a flash memory stick, etc.), and numerous other elements and functionalities typical of today's computers (not shown). The Computer System (400) may also include input means, such as a Keyboard (408), a Mouse (410), or a microphone (not shown). Further, the Computer System (400) may include output means, such as a Monitor (412) (e.g., a liquid crystal display (LCD), a plasma display, or cathode ray tube (CRT) monitor). The Computer System (400) may be connected to a Network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the Computer System (400) includes at least the minimal processing, input, and/or output means necessary to practice embodiments of the invention.

Further, in one or more embodiments of the invention, one or more elements of the aforementioned Computer System (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing an electronic document (ED) concurrently accessed by a plurality of editors, comprising:
receiving, by a processor, a first chunk size for the ED;
partitioning the ED into a plurality of chunks;
receiving, from a first editor of the plurality of editors, a selection of a first chunk of the plurality of chunks, wherein the first chunk is of the first chunk size;
locking the first chunk in response to determining that the first chunk is available for editing;
sending, to the first editor, a first message indicating that the first chunk has been locked;
sending, to a graphical user interface (GUI) operated by a second editor of the plurality of editors, a second message indicating that the first chunk has been locked, wherein the GUI highlights the first chunk in the ED being concurrently displayed to the second editor in response to the second message; and
altering, while the first chunk is locked, the first chunk size in response to a change in the number of the plurality of editors,
wherein the first chunk size of the first chunk is dynamically increased while the first chunk is locked in response to a decrease in the number of the plurality of editors, and
wherein the first chunk size of the first chunk is dynamically decreased while the first chunk is locked in response to an increase in the number of the plurality of editors.

2. The method of claim 1, wherein the first chunk size is a paragraph.

3. The method of claim 1, further comprising:
identifying a size of the ED;
identifying a number of the plurality of editors concurrently accessing the ED; and
calculating, based on the size and the number of the plurality of editors, the first chunk size for the ED.

4. The method of claim 1, further comprising:
receiving, from the second editor, a selection of a second chunk of the plurality of chunks, wherein the second chunk is of a second chunk size; and
locking the second chunk in response to determining that the second chunk is available for editing,
wherein the first chunk size and the second chunk size are different.

5. The method of claim 1, further comprising:
receiving, from the second editor and while the first chunk is locked, a request to modify a format of the first chunk; and
altering the format of the first chunk based on the request.

6. The method of claim 1, wherein the ED is an Open Office Extensible Markup Language (OOXML) document.

7. A non-transitory computer-readable medium (CRM) storing a plurality of instructions for managing an electronic document (ED) concurrently accessed by a plurality of editors, the plurality of instructions comprising functionality to:
receive a first chunk size for the ED;
partition the ED into a plurality of chunks;
receive, from a first editor of the plurality of editors, a selection of a first chunk of the plurality of chunks, wherein the first chunk is of the first chunk size;
lock the first chunk in response to determining that the first chunk is available for editing;
send, to the first editor, a first message indicating that the first chunk has been locked;
send, to a graphical user interface (GUI) operated by a second editor of the plurality of editors, a second message indicating that the first chunk has been locked, wherein the GUI highlights the first chunk in the ED being concurrently displayed to the second editor in response to the second message; and alter, while the first chunk is locked, the first chunk size in response to a change in the number of the plurality of editors, wherein the first chunk size of the first chunk is dynamically increased while the first chunk is locked in response to a decrease in the number of the plurality of editors, and wherein the first chunk size of the first chunk is dynamically decreased while the first chuck is locked in response to an increase in the number of the plurality of editors.

8. The non-transitory CRM of claim 7, wherein the first chunk size is a paragraph.

9. The non-transitory CRM of claim 7, the plurality of instructions comprising further functionality to:
identify a size of the ED;
identify a number of the plurality of editors concurrently accessing the ED; and
calculate, based on the size and the number of the plurality of editors, the first chunk size for the ED.

10. The non-transitory CRM of claim 7, the plurality of instructions comprising further functionality to:
receive, from the second editor, a selection of a second chunk of the plurality of chunks, wherein the second chunk is of a second chunk size; and
lock the second chunk in response to determining that the second chunk is available for editing,
wherein the first chunk size and the second chunk size are different.

11. The non-transitory CRM of claim 7, the plurality of instructions comprising further functionality to:
receive, from the second editor and while the first chunk is locked, a request to modify a format of the first chunk; and
alter the format of the first chunk based on the request.

12. The non-transitory CRM of claim 7, wherein the ED is an Open Office Extensible Markup Language (OOXML) document.

13. A system for managing an electronic document (ED) concurrently accessed by a plurality of editors, comprising:
a server that comprises one or more processors and that:
receives a first chunk size for the ED;
partitions the ED into a plurality of chunks;
receives, from a first editor of the plurality of editors, a selection of a first chunk of the plurality of chunks, wherein the first chunk is of the first chunk size;
locks the first chunk in response to determining that the first chunk is available for editing;
sends, to the first editor, a first message indicating that the first chunk has been locked;
sends, to a second editor of the plurality of editors, a second message indicating that the first chunk has been locked; and
alters, while the first chunk is locked, the first chunk size in response to a change in the number of the plurality of editors,
wherein the first chunk size of the first chunk is dynamically increased while the first chunk is locked in response to a decrease in the number of the plurality of editors, and
wherein the first chunk size of the first chunk is dynamically decreased while the first chunk is locked in response to an increase in the number of the plurality of editors;
a first device of the first editor that:
sends the selection of the first chunk; and
receives the first message; and
a second device of the second editor that:
receives the second message; and
highlights the first chunk in the ED being concurrently displayed to the second editor in response to the second message.

14. The system of claim 13, wherein the first chunk size is a paragraph.

15. The system of claim 13, the server comprising further functionality to:
identify a size of the ED;
identify a number of the plurality of editors concurrently accessing the ED; and
calculate, based on the size and the number of the plurality of editors, the first chunk size for the ED.

16. The system of claim 13, the server comprising further functionality to:
receive, from the second editor, a selection of a second chunk of the plurality of chunks, wherein the second chunk is of a second chunk size; and
lock the second chunk in response to determining that the second chunk is available for editing,
wherein the first chunk size and the second chunk size are different.

17. The system of claim 13, the server comprising further functionality to:
receive, from the second editor and while the first chunk is locked, a request to modify a format of the first chunk; and
alter the format of the first chunk based on the request.

18. A method for managing an electronic document (ED) concurrently accessed by a plurality of editors, comprising:
receiving a chunk size for the ED;
partitioning the ED into a plurality of chunks, wherein each of the chunks is a unit for locking the chunk from other editors in response to a selection of the chunk for editing by a first editor; and
altering the chunk size of a chunk while the chunk is locked in response to
a change in the number of the plurality of editors,
wherein the chunk size of the chunk is dynamically increased while the chunk is locked in response to a decrease in the number of the plurality of editors, and
wherein the chunk size is dynamically decreased while the chunk is locked in response to an increase in the number of the plurality of editors.

* * * * *